(12) United States Patent  
Kolbe

(10) Patent No.: US 12,238,628 B2
(45) Date of Patent: Feb. 25, 2025

(54) ESTABLISHING A DATA PLANE SESSION FOR A USER EQUIPMENT WITH A TELECOMMUNICATIONS NETWORK USING AN ACCESS NETWORK OF THE TELECOMMUNICATIONS NETWORK

(71) Applicant: Deutsche Telekom AG, Bonn (DE)

(72) Inventor: Hans-Joerg Kolbe, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/553,736

(22) PCT Filed: Apr. 7, 2022

(86) PCT No.: PCT/EP2022/059225
§ 371 (c)(1),
(2) Date: Oct. 3, 2023

(87) PCT Pub. No.: WO2022/218805
PCT Pub. Date: Oct. 20, 2022

(65) Prior Publication Data
US 2024/0187961 A1    Jun. 6, 2024

(30) Foreign Application Priority Data
Apr. 14, 2021   (EP) ..................... 21168450

(51) Int. Cl.
*H04W 40/02*    (2009.01)
*H04L 45/302*   (2022.01)
(Continued)

(52) U.S. Cl.
CPC .......... *H04W 40/02* (2013.01); *H04L 45/302* (2013.01); *H04L 45/74* (2013.01); *H04L 47/22* (2013.01)

(58) Field of Classification Search
None
See application file for complete search history.

(56) References Cited

U.S. PATENT DOCUMENTS 7,110,356 B2 *   9/2006   Illikkal ................... H04L 45/22
                                                     398/5
9,055,557 B1     6/2015   Bayar et al.
(Continued)

FOREIGN PATENT DOCUMENTS

GB         2593499 A      9/2021
GB         2602794 A      7/2022

*Primary Examiner* — Brian S Roberts
(74) *Attorney, Agent, or Firm* — LEYDIG, VOIT & MAYER, LTD.

(57) ABSTRACT

Establishing a data plane session for a user equipment with a network using an access network requires the existence of a data path in or through a forwarding entity of the network. The forwarding entity is part of the access network or is an IP edge network node, wherein the data path within the forwarding entity corresponds to a programmed data path in or through a forwarding entity defined by means of data path configuration information being used to identify the user equipment and/or the data plane session using the data path, wherein in order to establish the session, the method includes establishing the data path within the forwarding entity as an at least partly programmed and/or pre-provisioned data path, including the data path configuration information, wherein establishing the session for the user equipment involves the session and/or the user equipment to be assigned to the existing pre-provisioned data path.

11 Claims, 2 Drawing Sheets

(51) Int. Cl.
 *H04L 45/74* (2022.01)
 *H04L 47/22* (2022.01)

(56) References Cited

U.S. PATENT DOCUMENTS

| | | | |
|---|---|---|---|
| 11,363,076 B2* | 6/2022 | Wong | H04M 7/0072 |
| 2012/0281540 A1 | 11/2012 | Khan et al. | |
| 2021/0176322 A1* | 6/2021 | Li | H04L 47/19 |
| 2022/0247692 A1* | 8/2022 | Chi | H04L 47/2483 |

* cited by examiner

ESTABLISHING A DATA PLANE SESSION FOR A USER EQUIPMENT WITH A TELECOMMUNICATIONS NETWORK USING AN ACCESS NETWORK OF THE TELECOMMUNICATIONS NETWORK

CROSS REFERENCE TO RELATED APPLICATIONS

This application is a U.S. National Phase application under 35 U.S.C. § 371 of International Application No. PCT/EP2022/059225, filed on Apr. 7, 2022, and claims benefit to European Patent Application No. EP 21168450.1, filed on Apr. 14, 2021. The International Application was published in English on Oct. 20, 2022 as WO 2022/218805 A1 under PCT Article 21(2).

FIELD

The present invention relates a method for establishing a data plane session of or for a user equipment with a telecommunications network using an access network of the telecommunications network, wherein establishing the data plane session may require the existence of a data path in or through a forwarding entity of the telecommunications network, the forwarding entity especially being part of the access network or being an IP edge network node, wherein the data path within the forwarding entity is or corresponds to a programmed data path in or through the forwarding entity.

Furthermore, the present invention relates to a telecommunications network for establishing a data plane session of or for a user equipment with the telecommunications network using an access network of the telecommunications network, wherein establishing the data plane session requires the existence of a data path in or through a forwarding entity of the telecommunications network, the forwarding entity especially being part of the access network or being an IP edge network node, wherein the data path within the forwarding entity is or corresponds to a programmed data path in or through the forwarding entity.

Additionally, the present invention relates to a network control node or element for controlling a forwarding entity of an inventive telecommunications network.

Furthermore, the present invention relates to a program, and a computer-readable medium or hardware logic description product comprising instructions which, when executed on a computer or on a network node of a telecommunications network or on a network control node or element or on a forwarding entity, causes the computer or the network node of the telecommunications network or the network control node or element or the forwarding entity to perform an inventive method.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future, especially due to the rapid spread of various data services as well as applications in such communication networks.

Currently, network packet processing chips or integrated circuits, which are typically used in high-performance network switches or traffic forwarding entities, are used to process and forward payload to serve subscribers connected to a telecommunications network. The functionality of such network packet processing chips or integrated circuits, also called ASICs (application-specific integrated circuit), commonly support to be programmed such as to be able to flexibly respond to the respective requirements of the telecommunications network.

Especially, so-called data paths are required to be programmed or established within such forwarding entities such that, e.g., a subscriber or customer of the telecommunications network is able to be provided with communication services such as network connectivity or other services. In such a scenario, i.e. in packet/frame-based telecommunications networks, each data path denotes the path that a frame or a (data) packet takes through the network (or through the forwarding entity), i.e. this includes the data path through the forwarding entity or network element. Especially, the data path denotes the sequential stages that a frame or (data) packet undergoes when being transported from an ingress to an egress port of the forwarding (or other) network entity.

SUMMARY

In an embodiment, the present disclosure provides a method for establishing a data plane session of or for a user equipment with a telecommunications network using an access network of the telecommunications network. Establishing the data plane session requires the existence of a data path through a forwarding entity of the telecommunications network, the forwarding entity being part of the access network or being an IP edge network node, wherein the forwarding entity is a chip or chipset, wherein the data path within the forwarding entity is or corresponds to a programmed data path through the forwarding entity being defined, at least in part, by means of data path configuration information, the data path configuration information, at least partly, being used while the data path being in operative use, to identify the respective user equipment and/or the respective data plane session using the data path, wherein, in order to establish or to set up the data plane session, the method comprises the following steps: in a first step, the data path is established and/or configured, and exists within the forwarding entity as an at least partly programmed and/or pre-provisioned data path comprising the data path configuration information, wherein upon the establishment and/or configuration of the data path, the respective data plane session is non-existent, in a second step, subsequent to the first step, the data plane session is established, after being requested by the user equipment, wherein establishing the data plane session of or for the user equipment involves the data plane session and/or the user equipment to be assigned to the existing pre-provisioned data path.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
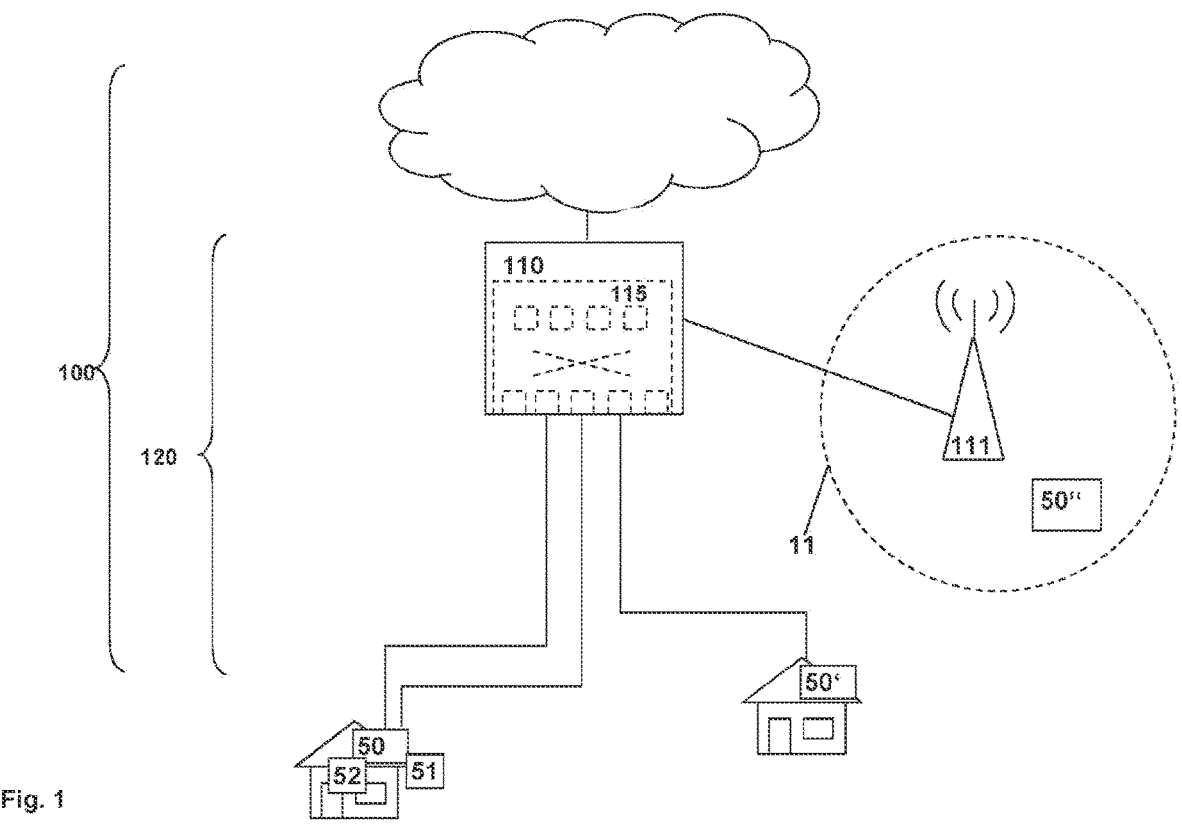
FIG. 1 schematically illustrates a telecommunications network according to the present invention, having—preferably—a fixed line part and a mobile (or cellular) part.

In accordance with an embodiment, the present invention provides a technically simple, effective and cost effective solution for establishing a data plane session of or for a user equipment with a telecommunications network using an access network of the telecommunications network involving a data path in or through a forwarding entity of the telecommunications network. In accordance with an another embodiment, the present invention provides a corresponding telecommunications network, a corresponding network control node or element for controlling a forwarding entity of the telecommunications network, and a corresponding program and computer-readable medium or hardware logic description product.

In accordance with another embodiment, the present invention provides a method for establishing a data plane session of or for a user equipment with a telecommunications network using an access network of the telecommunications network, wherein establishing the data plane session may require the existence of a data path in or through a forwarding entity of the telecommunications network, the forwarding entity especially being part of the access network or being an IP edge network node, wherein the data path within the forwarding entity is or corresponds to a programmed data path in or through the forwarding entity being defined, at least in part, by means of data path configuration information, the data path configuration information, at least partly, being used—while the data path being in operative use—to identify the respective user equipment and/or the respective data plane session using the data path, wherein in order to establish or to set up the data plane session, the method comprises the following steps:

in a first step, the data path is established and/or configured, and exists within the forwarding entity as an at least partly programmed and/or pre-provisioned data path comprising the data path configuration information, comprising the data path configuration information, in a second step, subsequent to the first step, the data plane session is established, especially after being requested by the user equipment, wherein establishing the data plane session of or for the user equipment involves the data plane session and/or the user equipment to be assigned to the existing pre-provisioned data path.

It is thereby advantageously possible according to the present invention to having already established a data path relating to (or being able to be used by) a data plane session of or for a user equipment at a point in time when this data plane session is only requested (typically by the user equipment) or being established. This enables to dramatically shorten the time to establish the data plane session for a user equipment—especially in case that a certain number of user equipments is requesting a respective data plane session simultaneously or quasi-simultaneously. Furthermore, it is advantageously possible according to the present invention that—after the establishment of the data paths—it is assured that the resources to establish such data paths (especially as part of the forwarding entity) are indeed available in order to be used for data plane sessions to be related to these data paths.

Typically, there is a number of different pieces of data path configuration information used to define a data path within one or a plurality of forwarding entities or nodes, such data path configuration information (or pieces thereof) comprising, e.g. a specific (IPv4 and/or IPv6) internet address, and/or a session identifier information or the like.

Conventionally, as at least part of such configuration information is used—while the data path is in operative use—to identify the respective user equipment and/or the respective data plane session using the considered data path. Hence conventionally, regarding one specific (piece of) such configuration information considered, this information is assigned first to a specific connection request (typically triggered by or received from a user equipment)—i.e. necessarily at a point in time after such a connection (or session establishment) request occurred —, and the corresponding data path (involving the specific one (piece of) configuration information considered) is established only thereafter. Consequently, the time interval between the initial connection request (or setup request to establish the respective user (data) session), on the one hand, and the point in time when the requested connection or session is actually operative, on the other hand, typically necessarily includes the time to setup or establish the data path within the forwarding entity. Additionally, in conventionally known systems—as the respective data path does typically not yet exist (or is not yet (fully or at least almost fully) established) at the time when the initial connection request or setup request to establish the respective user (data) session is issued or generated—it cannot be guaranteed that the respective resources, used to establish the respective data path (especially resources within the forwarding entity) are actually available. Hence, there is at least a small risk that such resources either do not exist (any more), or that additional time may be required in order to provide such resources.

In the context of the present invention, a data path typically refers to a networking entity-internal path (i.e. within a networking entity (or forwarding entity, typically an ASIC), typically having a plurality of ingress ports and a plurality of egress ports, a data path is programmatically defined, realizing a path within this networking or forwarding entity for the processing of data, especially data packets (or data frames). Such a data path is, in the context of the present invention, especially (but not necessarily) restricted to the (data) path through a single functional entity (or forwarding entity), in most cases a computer chip such as an ASIC. Typically, such a data path comprises (or is programmatically defined such as to comprise) (data path) actions as sequence of processing steps configured with per-subscriber session information (i.e. the data path configuration information), such as IP address and session number as well as parameters that may or may not differ for various subscriber such as shaping rate and classification lists.

Hence, in the forwarding entity, typically a computer chip like an ASIC, the (data) path is programmed. Operatively, such a (data) path commonly processes a (data) packet according the following sequence of steps: a parser classifies the (data) packet then sets it on a pre-programmed path according to the classification. All (data) packets (together), belonging to a certain classification, constitute a so-called flow (of (data) packets).

In broadband access networks, usually a flow is programmed per subscriber, a subscriber being the representation of all traffic to and from a certain access device (or user equipment) such as residential gateway or smart phone.

The data path of such a subscriber flow typically includes general actions that apply to many subscribers as well as specific actions that, e.g., depend on the respective specific IP address of the subscriber and/or the respective specific session identifier and/or the maximum bandwidth allowed, etc.

Thus, the programming of the paths of the subscribers needs to be done when all information such is available. This usually happens as soon as the network attachment is finished (e.g. the PPPOE session setup (point-to-point-protocol over Ethernet session setup) for, typically, fixed line services, or the GTP session setup (GPRS tunneling protocol, general packet radio service tunneling protocol, session setup) in, typically, the mobile network case).

Programming an individual (i.e. subscriber-specific) path (or at least: an individual (data) path, having subscriber-specific parts or processing steps or stages) through a modern chipset, especially an ASIC, may require a certain amount of time that can slow down the time it takes for getting the subscriber, requesting the respective communication service, into service. In addition, in case that an accurate model is lacking to predict resource availability of the processing elements in the data path, it might also arrive that such an attempted programming fails.

According to the present invention, the path programming times are reduced, especially for cases where a larger number of paths need to be programmed at the same time or quasi-simultaneously. Furthermore, it is advantageously possible to pre-provision (data) paths in order to keep resources available (or to provide resources) in advance, not having to risk a path not being able to be set up (due to a lack of resources).

According to the present invention, it is, thus, advantageously possible to dramatically decrease the session setup time, especially in case that the only operation in order to put an already established data path into operation is to stitch the respective data path to the user equipment's (virtual) access line identifiers. While this decrease in session setup time might be negligible for individual sessions, in case that a large number of sessions needs to be set up, the reduction of the setup time according to the present invention is typically from around 10 minutes (or even more than 10 minutes) to basically an instantaneous setup of user sessions (or a reduction of time in the order of at least 2 orders of magnitude, i.e. from around 600 seconds to less than a couple of seconds or even less than one second).

Furthermore, the management system of the telecommunications network is able to always guarantee the setup of (or the possibility to be able to set up) a (requested) data session since (as such a management system is typically always fully aware of the available resources) the corresponding data path is already available and the corresponding resources on the chipset have been granted.

Hence, according to the present invention, it is advantageously possible to realize an improved establishment of a data plane session of or for a user equipment with a telecommunications network. The establishment of the data plane session typically may require the existence of a data path in or through a forwarding entity, especially being part of the access network or being an IP edge network node of the telecommunications network. The data path is a programmed data path in or through the forwarding entity, and is defined, at least in part, by means of data path configuration information, wherein the data path configuration information are, at least partly, used to identify the respective user equipment and/or the respective data plane session using the data path (while the data path being in operative use). According to the present invention, the data plane session is able to be set up or established by means of firstly establishing (or configuring) the data path (such that it exists within the forwarding entity as an at least partly programmed and/or pre-provisioned data path comprising the data path configuration information, at least a part thereof being used to identify the respective user equipment and/or the respective data plane session), and secondly establishing the data plane session of or for the user equipment (involving the data plane session and/or the user equipment to be assigned to the existing pre-provisioned data path).

It is thereby advantageously possible according to the present invention to establish the data plane session more quickly and/or more reliably than conventionally possible.

The telecommunications network according to the present invention might be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

According to the present invention, it is advantageously possible and preferred that upon the establishment and/or configuration of the data path in the first step, the respective data plane session is non-existent, especially due to the user equipment not yet having requested the data plane session, wherein especially, in the first step, further data paths are established and/or configured—besides the data path —, wherein all these data paths exist within the forwarding entity as at least partly programmed and/or pre-provisioned data paths, wherein especially during the first step, the data paths are not yet associated or assigned to the user equipment or to other user equipments.

It is thereby advantageously possible to already generate or program suitable data paths at a point in time when these data paths do not yet operatively exist; this saves time to get live in case that a user data session is requested. Furthermore, it can thereby be assured that the corresponding resource (for establishing the data path) are actually available (and not only 'theoretically').

According to the present invention, it is advantageously furthermore possible and preferred that the data path configuration information comprises at least one of the following pieces of information:

- an internet protocol address used for the user equipment within the data plane session,
- a session number or session identifier of the data plane session, especially an access tunnel session number or identifier,
- traffic shaping rates per data plane session or sub-flow therein,
- packet/frame classification lists for assigning packets to QoS classes or applying IP filters or similar use cases.

It is thereby advantageously possible to define the respective data path or data paths as completely as possible and as close to their operative configuration as possible. Typically, there is not a huge number of different user data session configurations used in a typical telecommunications network; normally, perhaps 80% or more of all user data sessions potentially operated (or operated at a given point in time) might be configured using a comparatively low number of different sets of data path configuration information (at least regarding the pieces of data path configuration information that are not user equipment-specific or session-specific such as a quality-of-service indication or parameter and/or a bandwidth indication or parameter or the like). Hence, according to the present invention, it is proposed to pre-configure or pre-provision a number of data paths in a comparatively small number of groups of data paths corresponding to the main configurations. It is then possible, at least in average in more than 80% of the cases of session requests, to use one of the pre-provisioned data paths—either directly and in unmodified form, or by means of applying only a slight modification regarding the configuration of the considered data path.

According to the present invention, it is advantageously possible and preferred that establishing the data plane session of or for the user equipment involves the user equipment requesting the session and providing an access identifier, especially to a network attachment service control plane entity or functionality, wherein the access identifier, especially at the access line, preferably corresponds to a virtual local area network identifier, VLAN ID, MPLS label information, information and/or a media access control address, MAC address, information.

By means of the user equipment requesting the session and providing an access identifier, especially to a network attachment service control plane entity or functionality, the session setup procedure is not modified, at least not modified from the perspective of the user equipment or of other network nodes of the telecommunications network that are not involved in the control data exchange between the network attachment service control plane entity or functionality, the forwarding entity, and perhaps a path database entity or functionality.

According to the present invention, it is advantageously possible and preferred that, within or as part of the forwarding entity, each one of the pre-provisioned data paths is identified by means of at least one internal unique identifier, wherein, in order to establish the data plane session or to put it into operation and to assign one of the pre-provisioned data paths to the data plane session and/or the user equipment, the at least one internal unique identifier is associated or assigned to one piece of information of the data path configuration information, wherein especially each one of the data paths comprises an uplink data path component and a downlink data path component, wherein each of the data path components are, within or as part of the forwarding entity, pre-provisioned data path components and are, respectively, likewise identified by means of an internal unique identifier, wherein especially the internal unique identifier is or corresponds to:
  the number of the processing table of the forwarding entity,
  associated meta data identifiers that may point to or comprise a subset of the configuration information.

It is thereby advantageously possible to easily assign a pre-configured data path to a user equipment requesting a data plane session.

Furthermore, it is advantageously possible and preferred according to the present invention that, regarding a first group of data paths, the data paths are established and/or configured using first values of the corresponding data path configuration information, respectively, and regarding a second group of data paths, the data paths are established and/or configured using second values of the corresponding data path configuration information, respectively, wherein, in the second step, the data plane session and/or the user equipment is assigned to an available existent data path of one of either the first or second groups of data paths, in dependence of the first or second groups having values of the data path configuration information suitable to the respective user equipment and/or to the respective data plane session to be established.

By means of pre-configuring the data paths organized in a certain number of groups of data paths, it is advantageously possible to cover a very large part of all ever occurring session establishment requests with a comparatively small number of different types of data paths.

Furthermore, and according to an alternative embodiment of the present invention, it is preferred that a path database entity or functionality is used to monitor and identify the available pre-provisioned data paths, wherein especially the path database comprises, regarding each data path, the respective data path configuration information, wherein especially the path database comprises, regarding each data path, the respective internal unique identifier.

According to a further preferred embodiment of the present invention, the data plane session of or for the user equipment is initiated or established by means of using one of the pre-provisioned data paths, thereby forcing the use of the respective data path configuration information, assigned to the respective data path, for the respective data plane session and/or the respective user equipment while in operative use.

According to a further embodiment of the present invention, in a third step, subsequent to the second step, the data plane session is operated by means of using the forwarding entity with the programmed data path on the basis of the data path configuration information, wherein especially the data path configuration information regarding the data path is modified such as to be suitable to the respective user equipment and/or to the respective data plane session prior to the third step.

By means operating the data plane session using the forwarding entity with the programmed data path on the basis of the data path configuration information (in unmodified form), it is advantageously possible to still further reduce the time to setup the data plane session. Otherwise, by means (slightly) modifying the data path configuration information regarding the data path used for a requested data plane session, it is advantageously possible to reduce the number of groups of data paths, and, hence, also limit the number of pre-provisioned but unused data paths.

Furthermore, the present invention relates to a telecommunications network for establishing a data plane session of or for a user equipment with the telecommunications network using an access network of the telecommunications network, wherein establishing the data plane session may require the existence of a data path in or through a forwarding entity of the telecommunications network, the forwarding entity especially being part of the access network or being an IP edge network node,
wherein the data path within the forwarding entity is or corresponds to a programmed data path in or through the forwarding entity being defined, at least in part, by means of data path configuration information, the data path configuration information, at least partly, being used—while the data path being in operative use—to identify the respective user equipment and/or the respective data plane session using the data path, wherein in order to establish or to set up the data plane session, the telecommunications network is configured such that:

the data path is established and/or configured, and exists within the forwarding entity as an at least partly programmed and/or pre-provisioned data path, comprising the data path configuration information, the data plane session is established, especially after being requested by the user equipment, wherein establishing the data plane session of or for the user equipment involves the data plane session and/or the user equipment to be assigned to the existing pre-provisioned data path.

Furthermore, the present invention relates to a network control node or element for controlling a forwarding entity of an inventive telecommunications network, the network control node or element especially being configured such that data paths exist within the forwarding entity as at least partly programmed and/or pre-provisioned data paths, wherein data plane sessions are established by means of assigning such data plane sessions and/or user equipments to the existing pre-provisioned data paths, respectively.

Still additionally, the present invention relates to a program comprising a computer readable program code or hardware logic description which, when executed on a computer or on a network node of a telecommunications network or on a network control node or element or on a forwarding entity, causes the computer or the network node of the telecommunications network or the network control node or element or the forwarding entity to perform the inventive method.

Furthermore, the present invention relates to a computer-readable medium or hardware logic description product comprising instructions which, when executed on a computer or on a network node of a telecommunications network or on a network control node or element or on a forwarding entity, causes the computer or the network node of the telecommunications network or the network control node or element or the forwarding entity to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having a fixed line part and a mobile (or cellular) part. User equipments or client devices 50, 50', 50" are connected to the telecommunications network 100 by means of an access network 120 (regarding the fixed line part of the telecommunications network 100, the access network 120 is especially a broadband access network). According to the exemplary embodiment shown in FIG. 1, the telecommunications network 100 comprises a logical or physical central office point of delivery 110 that is preferably realized within a data center and that is especially handling different access requirements, especially different access possibilities, of the client devices or user equipments 50, 50', 50" to network functionalities provided by the telecommunications network 100 or via the telecommunications network 100. According to the exemplary embodiment shown in FIG. 1, further devices (or client devices) 51, 52 are connected to the logical or physical central office point of delivery 110 by means of a user equipment 50 in the form of a home gateway or customer premises equipment device or by means of a customer premises equipment functionality (or user equipment functionality) that might be built in the further devices 51, 52 (or client devices). Preferably but not necessarily, the central office point of delivery 110 comprises a switching fabric 115 comprising a plurality of spine network nodes and typically also a plurality of leaf network nodes which are not explicitly represented in FIG. 1. As part of the mobile (or cellular) part of the telecommunications network 100 a base station entity 111 is schematically shown, having a radio coverage area or radio cell, schematically being represented by means of a dashed-line circle designated by reference sign 11. A user equipment 50" is linked to the base station entity 111 using a radio connection (not specifically shown in FIG. 1), and the base station entity 111 is linked or connected to (or part of) the access network 120.

Figure 2:
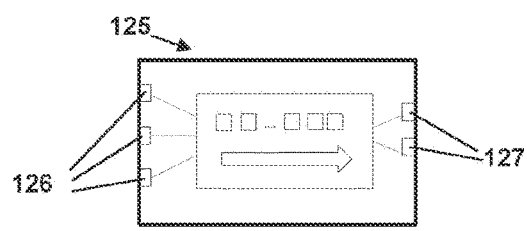
FIG. 2 schematically illustrates a packet processing system or network component or entity or forwarding entity according to the present invention, having ingress ports as well as egress ports, and processing components, thereby being able to realize data paths.

FIG. 2 schematically illustrates a packet processing system or network component or entity or forwarding entity 125 according to the present invention, having ingress ports 126 as well as egress ports 127, and processing components (not specifically indicated by means of reference signs in FIG. 1), thereby being able to realize data paths. The forwarding entity 125 is especially provided as a P4 processor or P4-capable processor (relating to the P4 ("Programming Protocol-Independent Packet Processors") programming language allowing a programmer to fully arbitrarily define how (data) packets traversing programmable forwarding entities 125 (or dataplane blocks) will be processed).

Figure 3:
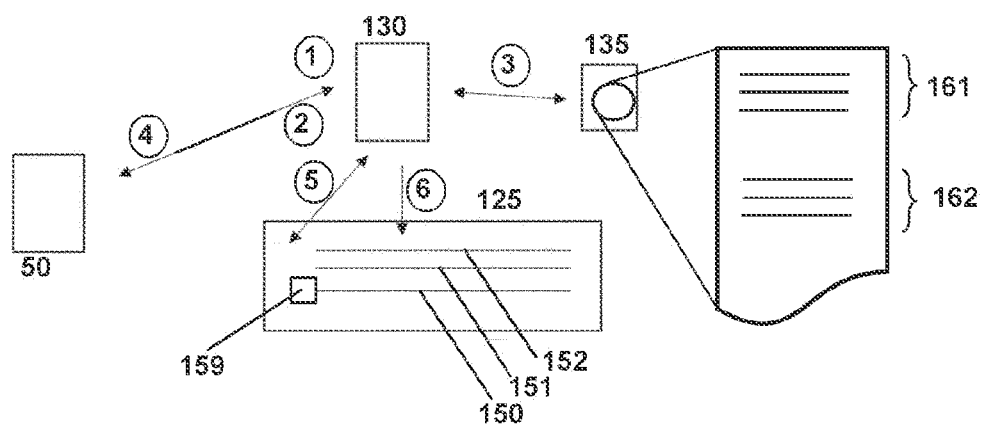
FIG. 3 schematically illustrates a part of a telecommunications network according to the present invention with a user equipment, a forwarding entity, a control entity, and a path database entity or functionality.

FIG. 3 schematically illustrates a part of a telecommunications network 100 according to the present invention with a (exemplary) user equipment 50, a forwarding entity 125, as well as a control entity 130 (or network control node or element 130, or also network attachment service control plane entity or functionality 130), and a path database entity or functionality 135. Within the forwarding entity 125, a first data path 150, a second data path 151, and a third data path 152 are schematically shown as examples of data paths realized or configured within the forwarding entity 125. Moreover, within the path database entity or functionality 135, a first group 161 of data paths and a second group 162 of data paths are schematically shown. Additionally, the first data path 150 is shown with an internal unique identifier 159.

Figure 4:
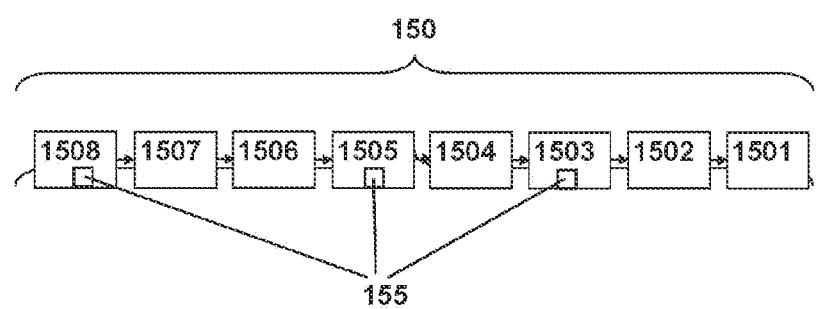
FIG. 4 schematically illustrates a representation of a data path.

According to the present invention, a (yet subscriber-unspecific) data path is established and/or configured, and (already) exists within the forwarding entity 125 as an at least partly programmed and/or pre-provisioned data path comprising the data path configuration information. With reference to FIG. 4, the first data path 150 is taken as an exemplary data path, and an exemplary data path configuration information 155 is schematically represented, and in FIG. 3, the three data paths 150, 151, 152 are schematically shown as examples of data paths.

According to the present invention, it is only in a second step (i.e. subsequent to the establishment or configuration of a data path, after the considered data path already exists within the forwarding entity 125 as a completely (or at least partly) programmed and/or pre-provisioned data path) that the data plane session is established, especially after being requested by the respective user equipment 50. This establishment of the data plane session of or for the user equipment 50 involves, according to the present invention, the data plane session and/or the user equipment 50 being assigned (or 'stitched') to the (already) existing pre-provisioned data path 150. Especially, upon the establishment and/or configuration of the data path 150 in the first step of the method according to the present invention, the respective data plane session is non-existent (not yet existent), especially due to the user equipment 50 not yet having requested the data plane session.

After this assignment (or 'stitching') of the data plane session and/or the user equipment 50 to the already existing pre-provisioned data path 150 (i.e. after the second step), in a third step, the data plane session is (operatively) operated by means of using the forwarding entity 125 with the respective specific programmed data path 150 on the basis of the respective specific data path configuration information 155. Either the existing pre-provisioned data path 150 already exactly corresponds to the configuration (for the respective specific user equipment 50 or data plane session); in this case, of course, no modification of the data path 150 may be required. Otherwise, if this is not (completely) the case, the data path configuration information 155 regarding such a data path 150 is (partly or slightly) modified such as to be suitable to the respective user equipment 50 and/or to the respective data plane session; such modification is typically applied prior to the data plane session being (operatively) operated by means of using the forwarding entity 125 with the respective specific programmed data path 150.

Typically and especially according to the present invention, not only one data path is established or configured beforehand but a plurality of such data paths is generally generated, i.e. further data paths 151, 152 (besides the data path 150 or first data path 150) are established and/or configured during the first step of the inventive method, and all these data paths 150, 151, 152 are existing within the forwarding entity 125 as at least partly programmed and/or pre-provisioned data paths 150, 151, 152; especially all these data paths 150, 151, 152 are, upon their generation or establishment, not yet associated or assigned to the user equipment 50 or to other user equipments 50', 50" during the first step.

FIG. 4 schematically illustrates a representation of an exemplary data path 150 (or first data path 150). More specifically, a typical data path according to the present invention comprises an uplink data path component and a downlink data path component, wherein each of the data path components are, within or as part of the forwarding entity 125, pre-provisioned data path components, being, respectively, identified by means of an internal unique identifier 159. Exemplarily, FIG. 4, represents a downlink data path component (or downstream data path), e.g. for a broadband subscriber session in downstream (or downlink) direction. Regarding such a typical data path (or data path component), several pieces of identifier information are specific to the subscriber such as the internet protocol address (or prefix), the access tunnel session identifier, specific service parameters such as the maximum bandwidth or access control lists that are collectively referred to by the term data path configuration information 155. For example, such a data path (or data path component) comprises a plurality of different (data path) actions or elements 1501, 1502, 1503, 1504, 1505, 1506, 1507, 1508 as sequence of processing steps—typically configured based on information (i.e. the data path configuration information 155) on a per-subscriber session basis. For example, the first data path action or element 1501 might relate to: a count and to sub/queue; the second data path action or element 1502 might relate to: shape/port/group and to port; the third data path action or element 1503 might relate to: shape/port/group and to sub/queue; the fourth data path action or element 1504 might relate to: layer 2 encapsulation with a per-subscriber tunneling header (e.g. PPPOE or GTP); the fifth data path action or element 1505 might be the traffic classification rules for the shaping: the sixth data path action or element 1506 may be the access control/firewall rules; the seventh data path action or element 1507 may be the removal of IP-backbone VPN labels or aggregate tunnel labels (e.g. L2TP); the eighth data path action or element 1508 might be IP routing table entries to map to a specific subscriber tunnel; especially, this example relates to the situation of a downstream processing of data packets, i.e. the data packets enter (or are received) at the eighth data path action or element 1508, and exits (or are outputted) at the first data path action or element 1501.

According to the present invention and with reference to FIG. 3, the present invention is especially realized in the following manner:

The system (and especially the forwarding entity 125) is pre-programmed with a certain number of subscriber data paths (representing a corresponding number of (potential) subscriber sessions), exemplarily represented by the first, second and third data path 150, 151, 152. It is furthermore preferred that, additionally, these pre-programmed or pre-provisioned data paths 150, 151, 152 are established forming groups of data paths such that a first group 161 of data paths are established and/or configured using first values of data path configuration information 155, respectively, and such that a second group 162 of data paths are established and/or configured using second values of data path configuration information 155, respectively. In case that the need arises to establish a user data session (especially after a request issued by a user equipment 50), i.e. in the second step of the inventive method, the data plane session and/or the user equipment 50 is assigned to a pre-provisioned available (i.e. existing) data path of one of either the first or second groups 161, 162 of data paths, in dependency of the first or second groups 161, 162 having values of the data path configuration information 155 suitable to the respective user equipment 50 and/or to the respective data plane session to be established. According to this line of thinking, e.g. a first group 161 of data paths comprising, e.g., 100 data paths, and a second group 162 of data paths comprising, e.g., 50 data paths is established. The first group 161 of data paths, i.e. 100 (one hundred) data paths (being able to handle 100 data sessions) are realized or established or programmed; as part of the respective data path configuration information 155 of each respective one of these data paths, corresponding IP addresses (such as the following 100 IP addresses 192.168.2.1-192.168.2.100) and/or corresponding PPP sessions (point-to-point-protocol sessions) (such as the following identifiers 0001-0100)

are assigned, and additional data path configuration information 155, such as 'standard ACL-1' (access control list 1), and 'standard quality-of-service (QOS) Classification' with a 'max rate (or bandwidth)' of 2 mbps are used.

Likewise, The second group 162 of data paths, i.e. 50 (fifty) data paths (being able to handle 50 data sessions) are realized or established or programmed; as part of the respective data path configuration information 155 of each respective one of these data paths, corresponding IP addresses (such as the following 50 IP addresses 192.168.2.102-192.168.2.151) and/or corresponding PPP sessions (point-to-point-protocol sessions) (such as the following identifiers 0301-0350)

are assigned, and additional data path configuration information 155, such as 'standard ACL-1' (access control list 1), and 'standard quality-of-service (QOS) Classification' with a 'max rate (or bandwidth)' of 10 mbps are used.

Once these two groups 161, 162 of data paths are established (i.e. corresponding to the first step according to the inventive method), the assignment (or association) of the user equipment 50 (or its requested user data session) to the respective data paths especially occurs as follows, involving the following processing steps:

In a first processing step (reference sign 1 in FIG. 4), the control plane signaling of the session set up is started.

In a second processing step (reference sign 2 in FIG. 4), the user equipment 50 requests a session ID (session identifier or session identifier information) and provides a unique identifier at the access line (such as VLAN IDs and/or MSAC addresses).

In a third processing step (reference sign 3 in FIG. 4), the control plane in the telecommunications network 100—especially the network attachment service control plane entity or functionality 130—picks one of the pre-defined (or pre-provisioned) data paths 150, 151, 152 (especially belonging to either the first or the second group 161, 162 of data paths) from its available "pool" (of pre-provisioned data paths; this pool of pre-provisioned and available data paths especially being tracked as part of the path database entity or functionality 135) and adapts the control plane signaling to the one (data path) it did pick (by, e.g., using the session identifier and/or the internet protocol address of the pool-entry chosen).

In a fourth processing step (reference sign 4 in FIG. 4), the control plane signaling is finished. In a fifth processing step (reference sign 5 in FIG. 4), the specific data path (chosen during the third processing step 3) is enabled (or rendered operative or put to operative use) by "stitching" the pre-provisioned data path (or flow) to the unique identifier at the access line, i.e. to the user equipment 50 requesting the session ID. This is able to be done, e.g., by means of an identifier specifically associated to the data path, such as the internal unique identifier 159, i.e. an internal identifier within the forwarding entity 125, or a handle or token information identifying such an internal unique identifier; in any case a pre-provisioned data path (potentially being operational or put into operation within the forwarding entity 125) needs to be able to be referred to by an identifying information of an entry within the path database entity or functionality 135. In a sixth processing step (reference sign 6 in FIG. 4), as an option, i.e. not necessarily, the control plane (i.e. the network attachment service control plane entity or functionality 130) may change one parameter or a plurality of parameters (of the data path configuration information 155 of the specific data path chosen) such es e.g. the shaper maximum bit rate, thereby being able to adapt the standard data path configuration (within the selected group of data paths) to the specific needs of the user equipment 50 or the user data session. Typically, such (rather isolated parameter modifications or adaptions) normally do not require too much time as the basic data path has already been established.

Hence, the user equipment 50 interacts with the central network attachment service control plane unit (NAS-CP) 130 for negotiating the subscriber session setup. The physical data flow for these control plane packets usually also passes through the forwarding entity 125. The NAS-CP 130 interacts with the path database entity or functionality 135 (Path-DB) that has an up-to-date inventory of the pre-provisioned data paths in the forwarding entity 125. The forwarding entity 125 is the chipset that provides the data path and all features for packet manipulation according to the service. As a matching entry (between the pre-configured data paths 150, 151, 152 and the user equipment 50), especially the internal unique identifier 159 is used; it is especially configured at the fifth processing step 5 and enables the data path communication of the user equipment 50 with the telecommunications network 100. Once this stitching (or assignment) has been done, the user equipment 50 is in service (i.e. the user data session operative) and can e.g. access the internet.

Hence, according to the present invention, a method and a system is provided to manage pre-provisioned data paths 150, 151, 152 on forwarding plane elements (forwarding element 125) in a broadband access network 120 (or in mobile network) and using these pre-provisioned data paths 150, 151, 152 during the setup of new subscriber sessions by effectively cross connecting (using as matching entry especially the internal unique identifier 159 of the respective data path within the forwarding entity 125, or a handle thereof) to the user equipment 50 and assigning the user equipment 50 the pre-provisioned parameters of the respective chosen data path. It is advantageously especially possible to update the respective data path after it had been assigned to a user equipment 50.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for establishing a data plane session of or for a user equipment with a telecommunications network using an access network of the telecommunications network, comprising:
in a first step, establishing and/or configuring a data path through a forwarding entity of the telecommunications network, wherein the forwarding entity is part of the access network or is an IP edge network node, wherein the data path exists within the forwarding entity as an at least partly programmed and/or pre-provisioned data path comprising data path configuration information, and wherein the data path configuration information, at least partly, is usable while the data path is in operative use to identify a respective user equipment and/or a respective data plane session using the data path; and
in a second step, subsequent to the first step, the data plane session is established, after being requested by the user equipment, wherein establishing the data plane session involves the data plane session and/or the user equipment being assigned to the data path;
wherein, within or as part of the forwarding entity, the data path is identified via at least one internal unique identifier, wherein, in order to establish the data plane session or to put the data plane session into operation and to assign the data path to the data plane session and/or the user equipment, the at least one internal unique identifier is associated or assigned to a piece of information of the data path configuration information; and
wherein the data path comprises an uplink data path component and a downlink data path component, wherein each of the data path components are, within or as part of the forwarding entity, pre-provisioned data path components and are, respectively, identified via an internal unique identifier, wherein the internal unique identifier is or corresponds to:
a number of a processing table of the forwarding entity, and/or
associated metadata identifiers that point to or comprise a subset of the data path configuration information.

2. The method according to claim 1, wherein in the first step, further data paths are established and/or configured besides the data path, wherein all the data paths exist within the forwarding entity as at least partly programmed and/or pre-provisioned data paths, wherein during the first step, the data paths are not yet associated or assigned to the user equipment or to other user equipments.

3. The method according to claim 1, wherein the data path configuration information comprises at least one of the following pieces of information:
an internet protocol address used for the user equipment within the data plane session,
a session number or session identifier of the data plane session,
traffic shaping rates per data plane session or sub-flow therein, or
packet/frame classification lists.

4. The method according to claim 1, wherein establishing the data plane session of or for the user equipment involves the user equipment requesting the session and providing an access identifier to a network attachment service control plane entity or functionality.

5. The method according to claim 4, wherein the access identifier corresponds to a virtual local area network identifier (VLAN ID), multiprotocol label switching (MPLS) label information, and/or media access control (MAC) address information.

6. The method according to claim 1, wherein, regarding a first group of data paths, the data paths are established and/or configured using first values of corresponding data path configuration information, respectively, and regarding a second group of data paths, the data paths are established and/or configured using second values of corresponding data path configuration information, respectively;
wherein, in the second step, the data plane session and/or the user equipment is assigned to an available existent data path of one of either the first or second groups of data paths, in dependence of the first or second groups having values of the data path configuration information suitable to the user equipment and/or to the data plane session.

7. The method according to claim 1, wherein a path database entity or functionality is used to monitor and identify available pre-provisioned data paths, wherein the path database entity or functionality comprises, regarding each available pre-provisioned data path, respective data path configuration information;
wherein the path database entity or functionality comprises, regarding each available pre-provisioned data path, a respective internal unique identifier.

8. The method according to claim 1, wherein the data plane session of or for the user equipment is initiated or established via using a respective pre-provisioned data path, thereby forcing the use of respective data path configuration information assigned to the respective pre-provisioned data path for the data plane session and/or the user equipment.

9. The method according to claim 1, wherein in a third step, subsequent to the second step, the data plane session is operated via using the forwarding entity with the data path on the basis of the data path configuration information;
wherein the data path configuration information regarding the data path is modified for the user equipment and/or the data plane session prior to the third step.

10. A telecommunications system for establishing a data plane session of or for a user equipment with the telecommunications network using an access network of the telecommunications network, the system comprising:
the user equipment, wherein the user equipment is configured to request the data plane session; and
a forwarding device configured for:
establishment and/or configuration of a data path through the forwarding device, wherein the forwarding device is part of the access network or is an IP edge network node, wherein the data path exists within the forwarding device as an at least partly programmed and/or pre-provisioned data path comprising data path configuration information, and wherein the data path configuration information, at least partly, is usable while the data path is in operative use to identify a respective user equipment and/or a respective data plane session using the data path; and
establishment of the data plane session, after being requested by the user equipment, wherein establishment of the data plane session involves the data plane session and/or the user equipment being assigned to the data path;

wherein, within or as part of the forwarding device, the data path is identified via at least one internal unique identifier, wherein, in order to establish the data plane session or to put the data plane session into operation and to assign the data path to the data plane session and/or the user equipment, the at least one internal unique identifier is associated or assigned to a piece of information of the data path configuration information; and wherein the data path comprises an uplink data path component and a downlink data path component, wherein each of the data path components are, within or as part of the forwarding device, pre-provisioned data path components and are, respectively, identified via an internal unique identifier, wherein the internal unique identifier is or corresponds to:

a number of a processing table of the forwarding device, and/or associated metadata identifiers that point to or comprise a subset of the data path configuration information.

11. One or more non-transitory computer-readable mediums having processor-executable instructions for establishing a data plane session of or for a user equipment with a telecommunications network using an access network of the telecommunications network, wherein the processor-executable instructions, when executed, facilitate performance of the following steps:

in a first step, establishing and/or configuring a data path through a forwarding entity of the telecommunications network, wherein the forwarding entity is part of the access network or is an IP edge network node, wherein the data path exists within the forwarding entity as an at least partly programmed and/or pre-provisioned data path comprising data path configuration information, and wherein the data path configuration information, at least partly, is usable while the data path is in operative use to identify a respective user equipment and/or a respective data plane session using the data path; and in a second step, subsequent to the first step, the data plane session is established, after being requested by the user equipment, wherein establishing the data plane session involves the data plane session and/or the user equipment being assigned to the data path;

wherein, within or as part of the forwarding entity, the data path is identified via at least one internal unique identifier, wherein, in order to establish the data plane session or to put the data plane session into operation and to assign the data path to the data plane session and/or the user equipment, the at least one internal unique identifier is associated or assigned to a piece of information of the data path configuration information; and wherein the data path comprises an uplink data path component and a downlink data path component, wherein each of the data path components are, within or as part of the forwarding entity, pre-provisioned data path components and are, respectively, identified via an internal unique identifier, wherein the internal unique identifier is or corresponds to:

a number of a processing table of the forwarding entity, and/or associated metadata identifiers that point to or comprise a subset of the data path configuration information.

* * * * *